United States Patent [19]

Huang

[11] Patent Number: 4,873,864
[45] Date of Patent: Oct. 17, 1989

[54] PRESSURE GAUGE WITH A MOVABLE INTERIOR SCALE

[76] Inventor: Tien-Tsai Huang, No. 4, Lane 30, Wu-Chuan St., Pan-Chiao, Taiwan

[21] Appl. No.: 216,373

[22] Filed: Jul. 8, 1988

[51] Int. Cl.$^4$ .................. B60C 23/02; G01L 7/16
[52] U.S. Cl. ..................... 73/146.8; 73/744; 116/34 R
[58] Field of Search ............. 73/146.8, 146.3, 744; 116/34 R, 272

[56] References Cited

U.S. PATENT DOCUMENTS 4,768,460 9/1988 Soon-Fu .................. 116/34 R

Primary Examiner—Donald O. Woodiel
Attorney, Agent, or Firm—Nixon & Vanderhye

[57] ABSTRACT

A pressure gauge with a movable interior scale is provided including an elongated hollow body having a closed chamber, an intake passage communicating with the closed chamber, and an air inlet communicating exteriorly of the pressure gauge. A charge port is provided between the closed chamber and the intake passage and a discharge port is provided communicating with the closed chamber and exteriorly of the pressure gauge. In addition, a spring-biased charge valve is disposed at the charge port and is normally biased to close the charge port. At the same time, the spring-biased charge valve is driven to open the charge port when pressurized air enters the intake passage. A sliding member is mounted in the closed chamber in sealing engagement with the chamber, and slidable in the chamber upon entry of pressurized air. A pressure indicating scale is carried by the sliding member and a display hole is formed in the body and aligned with the scale so that the scale is visible through the display hole. A spring-biased discharge valve is disposed at the discharge port and is normally biased to close the discharge port, but is manually openable to release pressurized air in the closed chamber. A spring is connected at an upper end to the charge valve and at a lower end to the sliding member for biasing the sliding member to ruturn to a normal position when pressurized air is released from the closed chamber.

2 Claims, 2 Drawing Sheets

PRESSURE GAUGE WITH A MOVABLE INTERIOR SCALE

BACKGROUND OF THE INVENTION

This invention relates to a pressure gauge, and more particularly to one which has a movable interior scale.

The improvement of this invention is directed to a conventional pressure gauge shown in FIG. 1 which is typically used to measure the air pressure in a tire. The conventional pressure gauge includes an adapter A for coupling with a tire's air valve, a tubular body B, and a movable scale C inserted partially into the tubular body B. The reading of the scale C is difficult. In addition, when impurities enter the interior of the tubular body B, the precision of the pressure gauge may be reduced.

SUMMARY OF THE INVENTION

It is therefore the main object of this invention to provide a pressure gauge with a movable interior scale.

According to this invention, a pressure gauge includes an elongated, hollow body having a closed chamber therein, an intake passage communicated with the closed chamber and having an air inlet communicated with the exterior of the pressure gauge, a charge port provided between the closed chamber and the intake passage, and a discharge port communicated with the closed chamber and the exterior of the pressure gauge. A spring-biased charge valve is disposed at the charge port for being biased to close the charge port so as to stop air flow between the closed chamber and the intake passage when no pressurized air enters the air passage and for being driven by pressurized air entering the air passage to open the charge port. A sliding member is mounted slidably in the closed chamber and is slidable as sealed in the closed chamber when pressurized air enters the closed chamber. The discharge port is positioned between the charge port and the sliding member. A pressure indicating scale is carried on top of the sliding member. A display hole is formed in the body and aligned with the scale so that the scale is visible through the display hole. A spring-biased discharge valve is disposed at the discharge port for being both biased to close the discharge port and driven to open the discharge port. A magnifier is fixed within the display hole so that the scale can be seen clearly. A spring is connected to the sliding member for biasing the sliding member to return to its normal position when the pressurized air is removed from the closed chamber.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figures 1, 2, 2A:
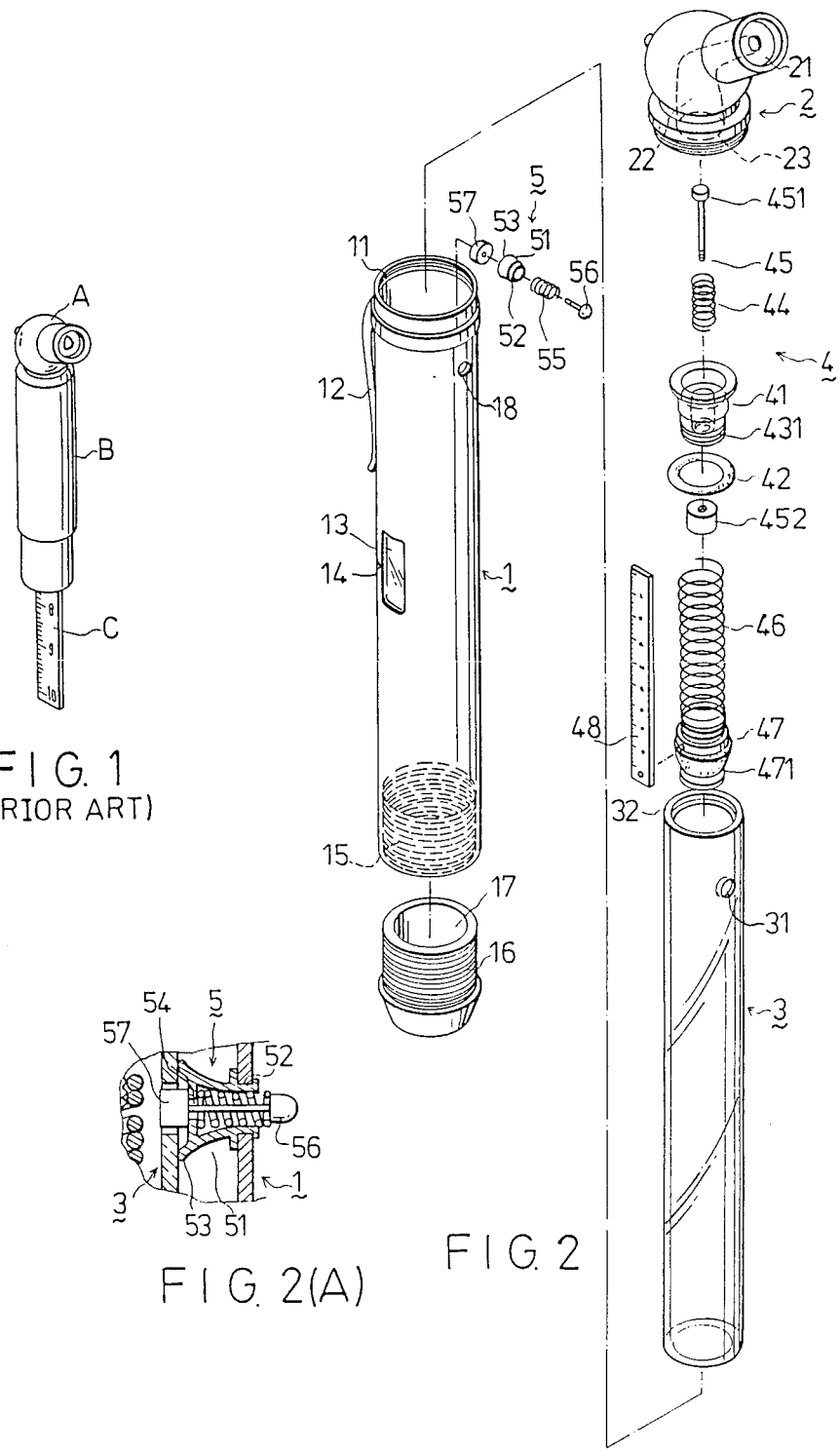
FIG. 1 is a perspective view of a conventional pressure gauge.
FIG. 2 is an exploded view of a pressure gauge according to this invention.
FIG. 2A is a sectional view showing the pressure discharge unit of the pressure gauge according to this invention.
Figure 5:
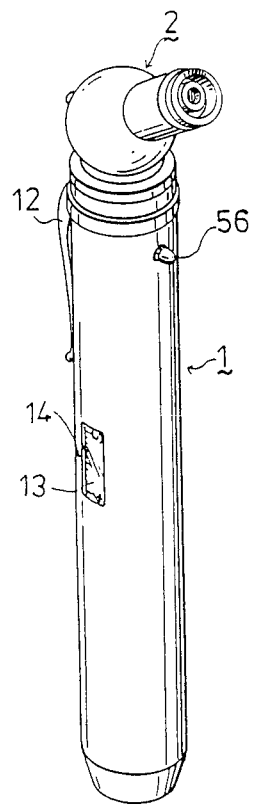
FIG. 5 is a perspective view showing the pressure gauge of this invention.
Figures 3, 4:
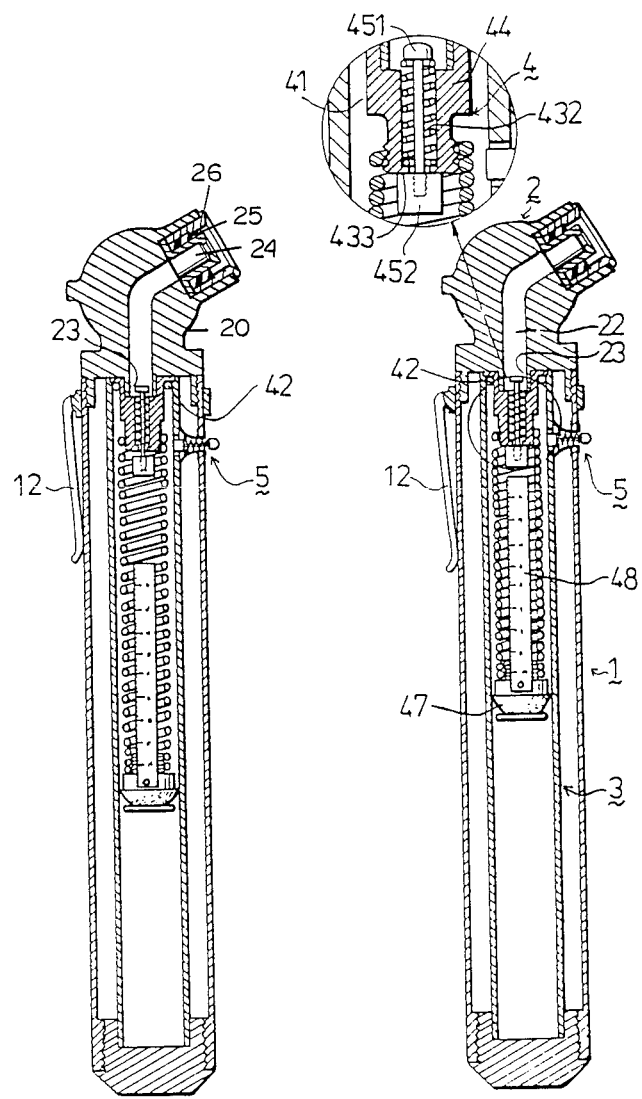
FIG. 3 is a sectional view showing the pressure gauge of this invention when it is idle.
FIG. 4 is a sectional view showing the pressure gauge of this invention when it is in use.

Referring to FIGS. 2 and 3, a pressure gauge of this invention includes an outer tube 1, an adapter 2, a transparent inner tube 3, a pressure measurement unit 4, and a pressure discharge unit 5. The outer tube 1 includes an internally threaded upper end 11, a clip 12 attached to its upper end, a display hole 13 formed in its middle portion, an indicating line 14 provided on its outer surface and terminated at the adjacent edge of the display hole 13, an internally threaded lower end 15, and a first discharge port 18. A magnifier is fit into the display hole 13. An externally threaded lower seal 16 is engaged with the lower end of the outer tube 1 and has a central bore 17 therein. The adapter 2 has an externally threaded lower end engaged with the upper end of the outer tube 1, and an air passage 22 having an inlet 21 and an outlet 23.

The adapter 2 is also provided with a conventional mechanism for depressing the tire valve to enable pressurized air from the tire to flow into the passage 22. This mechanism includes a chuck 24, a rubber ring 25 disposed about the chuck, and a tubular retaining member 26 for locking the ring 25 to the chuck 24. Chuck 24 is adapted to connect with the air valve of a tire in a conventionl manner. The inner tube 3 extends through the outer tube 1 to engage tightly with the bore 17 of the lower seal 16 and has a second discharge port 31 aligned with the first discharge port 18 of the outer tube 1, and an internally threaded upper end 32.

The pressure measurement unit 4 includes a charge valve member 41 having an outward flange formed at its upper end, an externally threaded lower end 431, an interior air passage 432, and an inward flange 433 formed at its lower end for defining a charge port inside of the inward flange 433. A compression spring 44 is placed in the air passage 432 so that a headed charge valve rod 451 extends through the spring 44. A charge valve 452 is formed in its upper end surface with a threaded hole which is engaged with the externally threaded lower end of the charge valve rod 451 to close the charge port. The outward flange of the charge valve member 41 is clamped between the adapter 2 and the inner tube 3. An O ring 42 is clamped between the upper ends of the valve member 41 and the inner tube 3 for establishing an air-tight seal therebetween. A sliding member 47 includes a seal 471 dividing the interior of the inner tube 3 into two closed air chambers. A scale 48 is formed in its lower end portion with a hole through which a tongue of the sliding member 47 is inserted tightly so that the scale 48 is carried on top of the sliding member 47 and moves therewith. A tension spring 46 is sleeved tightly on the externally threaded lower end 431 of the charge valve member 41 at its upper end and connected securely to the sliding member 47 at its lower end for biasing the sliding member 47 to move upward.

The pressure discharge unit 5 (see FIG. 2A) includes a hollow, truncately conical coupling element 51 bridging the gap between the outer tube 1 and the inner tube 3 for the defining of an exhaust passage between the first discharge port 18 of the outer tube 1 and the second discharge port 31 of the inner tube 3. As illustrated, an air-tight seal is established between the small-diameter end 52 of the coupling element 51 and the second discharge port 31 of the inner tube 3 and between the large-diameter end 53 of the coupling element 51 and the first discharge port 18 and the outer tube 1. A discharge valve unit is constructed in a similar manner to the charge valve unit and includes a headed discharge valve rod 56, a discharge valve 57 secured to the discharge valve rod 56, and a compression spring 55 sleeved on the discharge valve rod 56, as shown in FIG. 2A. The discharge valve 57 is normally closed and can be opened by pushing the head of the discharge valve rod 56.

Referring to FIG. 4, when the adapter 2 is coupled with a tire (not shown) in such a manner that when the air passage 22 of the adapter 2 is communicated with the air valve of the tire, pressurized air impels the charge valve 452 to move downward so that the charge port is opened. The pressurized air therefore flows into the inner tube 3 to move the sliding member 47 downward against the biased force of the tension spring 46. When the scale 48 stops, the mark of the scale aligned with the indicating line 14 can be seen through the magnifier. When the pressure gauge is removed from the air valve of the tire, the charge valve 452 is pushed upward by the spring 44 to close the charge port so that the sliding member 47 and hence the scale 48 are rendered immovable for a more convenient reading of the pressure value being measured.

When it is desired to reset the pressure gauge after use, the discharge valve rod 56 is pushed inward to open the discharge port, permitting the pressurized air to flow out of the interior of the inner tube 3.

With this invention thus explained, it is apparent that numerous modifications and variations can be made without departing from the scope and spirit of this invention. It is therefore intended that this invention be limited only as indicated in the appended claims.

I claim:

1. A pressure gauge comprising:

an elongated hollow body having a closed chamber therein, an intake passage communicating with said closed chamber and having an air inlet communicating exteriorly of said pressure gauge, a charge port provided between said closed chamber and said intake passage, and a discharge port communicating with said closed chamber and exteriorly of said pressure gauge;

a spring-biased charge valve disposed at said charge port, normally biased to close said charge port so as to stop air flow between said closed chamber and said intake passage when no pressurized air enters said intake passage, and driven to open said charge port by pressurized air entering said intake passage;

a sliding member mounted in said closed chamber in sealing engagement therewith, and slidable in said closed chamber when pressurized air enters said closed chamber, said discharge port being positioned between said charge port and said sliding member;

a pressure indicating scale carried by and extending away from said sliding member;

a display hole formed in said body and aligned with said scale so that said scale is visible through said display hole;

a spring-biased discharge valve disposed at said discharge port normally biased to close said discharge port and manually openable to release pressurized air in said closed chamber; and a spring connected at an upper end to said charge valve and at a lower end to said sliding member for biasing said sliding member to return to a normal position when said pressurized air is released from said closed chamber.

2. A pressure gauge as claimed in claim 1, wherein said display hole includes a magnifier fixed therein so that said scale can be seen clearly.

* * * * *